United States Patent [19]

Wichterle

[11] 4,153,349

[45] * May 8, 1979

[54] SOFT CONTACT LENS WITH THIN EDGE

[75] Inventor: Otto Wichterle, Prague, Czechoslovakia

[73] Assignee: NPD Technologies, Inc., Las Vegas, Nev.

[*] Notice: The portion of the term of this patent subsequent to Jan. 2, 1985, has been disclaimed.

[21] Appl. No.: 519,383

[22] Filed: Oct. 30, 1974

Related U.S. Application Data

[63] Continuation of Ser. No. 186,800, Oct. 5, 1971, abandoned, which is a continuation of Ser. No. 827,092, May 12, 1969, abandoned, which is a continuation of Ser. No. 318,627, Oct. 24, 1963, abandoned, which is a continuation-in-part of Ser. No. 229,727, Oct. 10, 1962, abandoned.

[51] Int. Cl.² .................................................. G02C 7/04
[52] U.S. Cl. ................................................. 351/160 H
[58] Field of Search ............................... 351/160–162; 264/1

[56] References Cited

U.S. PATENT DOCUMENTS

| 2,241,415 | 5/1941 | Moulton | 351/160 X |
| 2,976,576 | 3/1961 | Wichterle et al. | 351/160 X |
| 3,093,447 | 6/1963 | Crandon | 264/1 |
| 3,220,960 | 11/1965 | Wichterle et al. | 351/160 X |

FOREIGN PATENT DOCUMENTS

921416  12/1954  Fed. Rep. of Germany ........... 351/160

Primary Examiner—Conrad J. Clark
Attorney, Agent, or Firm—Cushman, Darby & CUshman

[57] ABSTRACT

This invention relates to novel contact lenses, to a method of preparing the same, and to apparatus for carrying out the method of the invention.

18 Claims, 7 Drawing Figures

SOFT CONTACT LENS WITH THIN EDGE

This application is a continuation of application Ser. No. 186,800, filed Oct. 5, 1971, which in turn is a continuation of application Ser. No. 827,092, filed May 12, 1969, which in turn is a continuation of application Ser. No. 318,627, filed Oct. 24, 1963, which in turn is a continuation-in-part of application Ser. No. 229,727, filed Oct. 10, 1962, all of the aforesaid applications now abandoned.

Contact lenses are usually made of glass or of substantially rigid plastics. It was disclosed in U.S. Pat. No. 2,976,576 that certain sparingly cross-linked polymeric hydrogels such as those of acrylates and methacrylates of polyhydric alcohols have optical and physiological properties which make them eminently suitable for use as contact lenses. The hydrogels are soft so that they cannot mechanically injure the eye, and they may be made isotonic with body fluids so that they maintain a desired degree of swelling when in contact with the eye.

Some difficulties were encountered heretofore in the manufacture of contact lenses from soft polymeric hydrogels. The polymerized material is too soft when in the swollen state to permit surface finishing, and too brittle when dried. It is therefore necessary that contact lenses be made from the hydrogels by polymerizing a suitable starting material in a mold whose surface configuration determines the lens surface.

In order to produce a useful lens, it was considered necessary heretofore to retain the polymerization mixture between two suitably curved mold surfaces. Shrinkage inevitably occurs during polymerization. If a completely closed mold were employed, the shrinking polymerization mixture would pull away from at least one mold surface, and control over its surface shape would be lost. In a known method for making contact lenses from the hydrogels referred to, a polymerization mixture is therefore held between a concave mold member and a convex mold member which are spaced from each other by an annular gap so that the molding initially formed has top and bottom surfaces respectively curved to conform to the mold members, and a rough annular edge connecting the top and bottom surfaces. The irregular configuration of the edge is caused by the shrinkage of the polymerization mixture.

The edge portion is removed by cutting, and the finished known lens has a cut edge of appreciable thickness which tends to catch the eyelid during movement of the latter when the contact lens is used, whereby the lens may be displaced from its normal position of alignment with the pupil of the eye. It would be desirable to avoid the possibility of such displacement by having a feather edge on the lens. The edge should be shaped in such a manner that tangents, drawn on the outer and inner faces of the lens in a common axial plane, form as small an angle as is possible. Ideally, the two main surfaces of the lens should have a common tangent at the edge.

Lenses made of rigid material, such as glass or polymethylmethacrylate, may be ground to this edge configuration, but a sharp edge is not permissible on rigid lenses because of the danger of cutting the eye. Contact lenses made of soft, tough, and resilient hydrogel material cannot injure the eye, but there is no known manner of grinding or polishing them to a feather edge.

An object of the invention, therefore, is the provision of a contact lens of soft polymeric material with an elasticity modulus up to 1,000 kg/cm$^2$ whose outer and inner surfaces meet in an evenly sharp feather edge at an angle substantially smaller than 45°. This primary object is to be achieved without impairing the optical performance of the lens, and without sacrificing the advantages of the afore-described method, such as the predictability of the refractive power of the lens produced and the absence of surface irregularities caused by contraction of the polymerization mixture. Another object simultaneously to be achieved is the absence of mechanical irritation of the cornea.

I have found that contact lenses consisting of hydrogels of the type disclosed in the afore-mentioned patent and having a feather edge may be prepared by polymerizing a suitable monomer composition in an open mold cavity having a concavely curved bottom surface and rotating about an upright axis transverse of that surface. There is obtained a shape-retaining polymer body having a convex bottom surface conforming to the mold surface, and a concave top surface which has approximately the shape of a paraboloid. If the diameter of the mold were large, the top surface of the polymer body would have a precisely parabolic sectional shape. In a body whose diameter is of the order of magnitude of a few millimeters, and which weighs between 20 and 200 milligrams, as is inherent in a contact lens, the parabolic shape is distorted by the effect of surface tension whose magnitude approaches the effect of the centrifugal and gravitational faces on the lens shape. The surface tension of a known polymerization mixture, however, is constant and predictable at a fixed temperature, and the refractive power of a lens of the invention is therefore predictable and reproducible. Lenses having powers covering substantially more than the conventional range of $-15$ diopters to $+15$ diopters are readily prepared by suitably adjusting the speed of rotation of the mold during polymerization.

Most refraction defects of human eyes can be corrected by lenses having a spherical outer surface, and prepared by polymerization of a suitable composition in a mold having a spherical concave surface. Satisfactory optical uniformity is achieved in a relatively small central portion of the lens. Since this surface portion is well known to be the only one of importance for correction of vision, such lenses are usually adequate. If perfect optical clearness of vision is required, a mold having a parabolic concave surface may be employed whereby homogeneity of refractive power may be obtained over a central lens portion which extends well beyond the largest practical iris opening.

Other features and many of the attendant advantages of this invention will be readily appreciated as the same becomes better understood by reference to the following detailed description of preferred embodiments thereof when considered in connection with the accompanying drawings in which:

Figure 1:
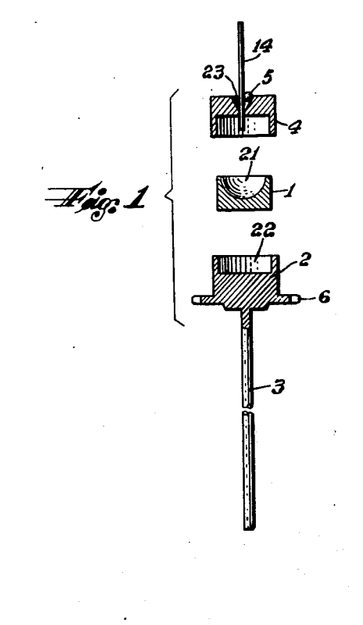
FIG. 1 shows the disassembled elements of a spherical polymerization mold of the invention in section on the axis of rotation.

Referring now to the drawing, and initially to FIG. 1, there is seen a disassembled mold for producing lens blanks of the invention. The mold consists of a bottom part 1 having the shape of a low cylinder with a hemispherical, upwardly open cavity 21 centered on the cylinder axis. The mold bottom 1 fits snugly into an upwardly open recess 22 of a cup shaped carrier 2 coaxially mounted on a normally upright shaft 3. The carrier 2 is equipped with an integral, coaxial gear 6. When the mold bottom 1 is inserted in the carrier 2, its rim projects from the cavity 22.

A cap or hollow cover 4 fits closely over the rim of the mold bottom 1. The carrier 2 and the cover 4 jointly form a substantially gas tight envelope about the mold bottom 1 in the assembled condition of the mold. Access to the cavity 21 of the mold bottom is had through a conically tapering aperture 23 in the cover 4. The aperture is normally sealed by a valve ball 5 under the weight of the ball. As shown in FIG. 1, a capillary tube 14 connected to a supply of inert gas such as argon or nitrogen free of oxygen is inserted in the aperture 23, displacing the self-closing ball 5.

Figure 2:
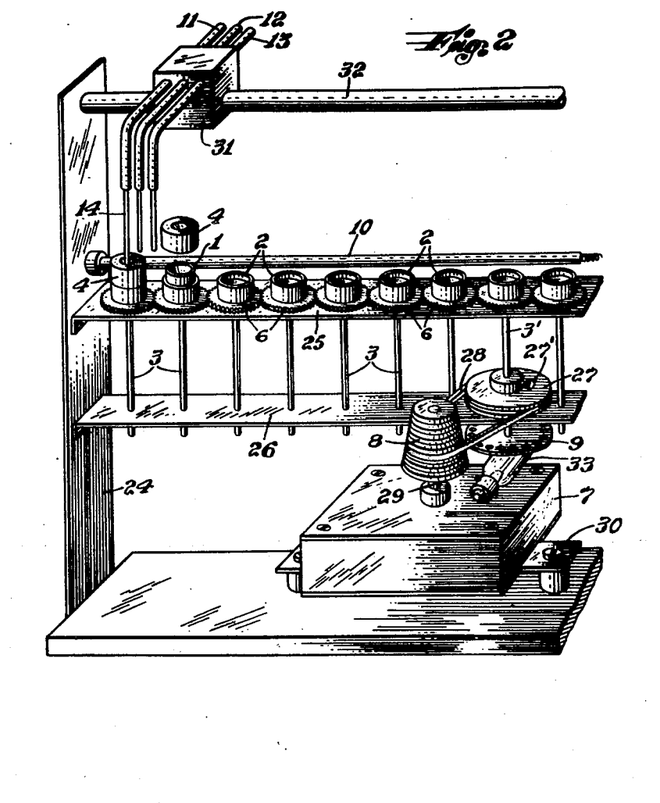
FIG. 2 is a fragmentary perspective view of an apparatus for manufacturing contact lens blanks equipped with a multiplicity of molds of the type shown in FIG. 1.

FIG. 2 shows a multiple centrifugal casting or polymerization device of a type preferred for manufacturing the contact lens blanks of the invention. A supporting frame 24 is equipped with two spacedly superposed brackets 25, 26. Vertically aligned openings in the brackets provide bearings for respective shafts 3 of a multiplicity of mold assemblies each composed of the elements shown in FIG. 1. The spacing of the bearing openings in the brackets 25, 26 is such that the several gears 6 of the carriers 2 meshingly engage so that all molds may be rotated in unison at the same speed.

The shaft 3' of one of the mold assemblies carries a pulley 27 equipped with a set screw 27' by means of which the pulley may be secured against rotation on the shaft 3' in any axial position between the brackets 25, 26. A belt 28 connects the pulley 27 to a drive pulley 8 composed of a plurality of fixedly connected, coaxial, grooved disks axially juxtaposed on the output shaft 29 of an electric gear motor 7. The motor is mounted on the frame 24 by a pivot 30, and is spring-loaded in a conventional manner, not visible in the drawing, to keep the belt 28 tight at all times and in engagement with any selected disk of the pulley 8.

A slide 31 is pivotally and axially movably mounted on a cylindrical rod 32 of the frame 24. The rod 32 is parallel to the row of mold assemblies on the brackets 25, 26. The slide carries the delivery ends of three tubes 11, 12, 13, each capable of being inserted in the apertures 23 of the several covers 4 of the mold assemblies. The tubes 11, 12, 13 are connected to proportionating pumps in a manner not further illustrated. The pumps are equipped with a conventional timer control (not shown) for delivering precisely measured amounts of liquid chemicals in a predetermined sequence while the delivery ends of the tubes 11, 12, 13 are sequentially introduced into the several mold assemblies. The operation of the control may be started by an operator.

Whether the drive shafts 3, 3' rotate at a desired uniform speed can be ascertained by means of a disk 9 mounted on the shaft 3' and provided with a row of uniformly spaced peripheral openings. A small neon lamp 33 is arranged to illuminate the disk from below. It is connected to a supply of alternating current in the usual manner (not shown). The disk 9 and the lamp 33 thus constitute a convenient and precise stroboscopic tachometer. The motor 7 is equipped with a built-in voltage regulator in order to maintain the constant speed of the output shaft 29 necessary for precisely reproducible results of the centrifugal casting or polymerization operation.

While only nine mold assemblies are shown in FIG. 2, the apparatus actually carries a row of fifteen assemblies, seven on each side of the drive shaft 3'. They rotate at the same speed which may be adjusted in steps of 0.5 revolutions per minute by shifting the axial positions of the pulley 27 and of the belt 28. Coarser speed change adjustments may be made by changing the gears of the motor 7 in a conventional manner.

The temperature of the several molds is adequately controlled by an electric heating rod 10 extending parallel to the row of mold assemblies and supplied with current through conventional controls such as a variable resistor (not shown). An operating temperature of 35° C. to 40° C. is readily maintained in the mold cavities.

The following examples are illustrative of the operation of the above-described apparatus.

EXAMPLE 1

The end of the tube 11 was inserted first in the cover 4 of the first mold assembly shown at the left of FIG. 2, and the required amount of a monomer mixture was metered through the narrow tube 11 into the cavity 21 of the mold. The tube 11 was then replaced in sequence by the tubes 12, 13, and the two components of a polymerization catalyst system were supplied. The monomer mixture consisted of 90% ethylene glycol mono methacrylate, 9.8% diethylene glycol mono methacrylate, and 0.2% ethylene glycol dimethacrylate which was the cross linking agent. The two components of the catalyst system were an aqueous 5% ammonium persulfate solution and 2-dimethylaminoethyl acetate.

The mold cavity 21 had a diameter of 13 millimeters, and the total amount of materials charged to the cavity was 70 milligrams. The three parts of the polymerization mixture were metered to the cavity at a ratio of 72:22:6, whereby the overall initial composition of the polymerization mixture was as follows (percent by weight):

| | |
|---|---|
| Ethylene glycol monomethacrylate | 64.8 |
| Diethylene glycol monomethacrylate | 7.056 |
| Ethylene glycol dimethacrylate | 0.144 |
| Water | 20.9 |
| Ammonium persulfate | 1.1 |
| 2-Dimethylaminoethyl acetate | 6.0 |

The motor 7 was started before the feeding of the polymerization ingredients. After feeding, the capillary tube 14 was inserted in the aperture 23, and a stream of pure argon was admitted. It displaced all oxygen present within a few seconds while also stirring the mixture. When the tube 14 was withdrawn, the valve ball 5 dropped into its normal closing position and sealed the mold cavity against atmospheric oxygen which would inhibit the polymerization in an uncontrolled manner.

While the mold rotated at a precisely uniform speed of 442 revolutions per minute, the homogeneous liquid mixture in the first mold shown at the left in FIG. 2 was permitted to polymerize for approximately 7 to 8 minutes while the second, third, and other molds were charged in sequence in the same manner as described hereinabove.

When the rotation of the first mold assembly was continued for 8 minutes, the cap 4 was removed and the bottom 1 was upwardly with drawn. It contained a form-retaining, fully transparent, gel-like body in the cavity 21. The mold bottom 1 holding the body was replaced in the assembly by an empty bottom in the apparatus of FIG. 2 for further processing. The mold bottom holding the partly polymerized, sparingly cross-linked material was set aside for about 20 minutes until copolymerization of the lens blank was completed. The mold bottom was then immersed in distilled water at 85° C., whereby the blank swelled and could thereafter be removed from the mold bottom without difficulty. It was then washed with distilled water until residual catalyst and other soluble impurities were removed.

The blank was finally immersed for storage in physiological saline solution until it reached osmotic equilibrium with the solution, and thereby with living body tissue, and assumed its final dimensions. Its refractive power was measured while the lens was immersed in the saline solution, and the refractive power of the lens when in contact with air was calculated as −4 diopters from the result of the measurements made.

The lens blanks formed in the other molds were processed in the same manner, and precisely identical contact lenses were obtained. It is evident that the apparatus shown in FIG. 2 may be operated semi-automatically with conventional controls to perform all operations except the insertion of mold bottoms 1 into the carriers 2, and removal of the bottoms from the carriers. Even these operations may be mechanized in an obvious manner.

Each polymerized lens was as clear as glass of good optical quality, fully transparent, soft, and resilient. It had a very thin edge which blended smoothly with the cornea surface when the lens was positioned on the eye. Because of the absence of a sudden step at the boundary of the cornea and lens surfaces, the lens did not irritate the eyelids of the wearer, nor did the sharp edge irritate the cornea as would happen with a more rigid lens.

The lens could be inserted by holding it between the tips of three fingers and placing it on the cornea of the open eye. The lens clung firmly to the eye surface, and centered itself on the cornea because of the almost perfect fit of the corresponding surfaces of lens and eye. A small difference between the curvature of a cornea and of a lens of the invention, as in cases of corneal astigmatism, is automatically compensated for by elastic deformation of the lens rim.

When the lens is stored in physiological saline solution prior to use, its water content is stable in contact with living tissue, and its dimensions therefore do not change while the lens is worn. Products of metabolism may freely diffuse from the eye to the free lens surface from which they are removed by the wiping action of the eyelids, and by the tears. Atmospheric oxygen dissolves in the hydrogel of the lens, and penetrates to the covered cornea. Properly chosen contact lenses of the invention may be worn for long continuous periods without discomfort, and many patients do not even remove the contact lenses of the invention during the night.

The lens may be removed from the eye by gripping it with clean finger tips. It may then be stored in physiological saline solution to which bacteriostatic or bacterioidal agents may be added. Boric acid and antibiotics are representative of suitable agents.

EXAMPLE 2

A contact lens blank was prepared on the apparatus of FIG. 2 in the manner of Example 1 from 90 milligrams of a modified polymerization mixture in a hemispherical mold of 10 millimeter diameter. The mixture had the following initial composition (percent by weight);

| Ethylene glycol monomethacrylate | 54.7 |
|---|---|
| Diethylene glycol monomethacrylate | 17.2 |
| Diethylene glycol dimethacrylate | 0.6 |
| Ammonium persulfate | 1.1 |
| Dimethylaminoethyl acetate | 5.8 |
| Water | 20.6 |

The mold was rotated during polymerization at 370 revolutions per minute. The finished lens had a refractive power of −7 diopters.

EXAMPLE 3

The apparatus of FIG. 2 was operated at 350 revolutions per minute, and a spherical mold having a diameter of 17 millimeters was charged with 50 milligrams of a polymerization mixture having the following composition (percent by weight):

| Ethylene glycol monomethacrylate | 60 |
|---|---|
| Diethylene glycol monomethacrylate | 17.7 |
| N,N'-methylene-bis-methacrylamide | 0.3 |
| Ammonium persulfate | 1.0 |
| p-Toluene sulfinic acid | 1.0 |
| Water | 20 |

The ammonium persulfate was introduced into the mold in the form of a 5% aqueous solution as described above. Cupric chloride was admixed to the persulfate solution at the rate of one drop of a 0.1% aqueous solution of $CuCl_2.2H_2O$ per 20 milliliters of the persulfate solution.

A temperature of 40° C. was maintained while the mixture was rotated in the mold for 12 minutes. The mold was then removed from the apparatus, and its contents were permitted to mature for 30 minutes. The procedure of Example 1 was followed in all other respects. The lens ultimately obtained had a refractive power of 0 diopters.

EXAMPLE 4

A lens blank was prepared on the apparatus of FIG. 2 using a mold bottom whose cavity was a paraboloid of 13.5 millimeters diameter. The radius of curvature of the mold center was 5.88 millimeters. The mold and its contents were rotated at 360 revolutions per minute for the periods indicated in Example 1. The polymerization mixture weighed 90 milligrams and had the following initial composition:

| Ethylene glycol monoacrylate | 63 |
|---|---|
| Diethylene glycol monoacrylate | 11.6 |
| Diethylene glycol dimethacrylate | 0.4 |
| Potassium persulfate | 1.2 |
| Water | 20 |

| Bis-(p-toluenesulfomethyl)-methylamine | 3.8 |
|---|---|

The last mentioned compound was prepared in a known manner from p-toluenesulfochloride, formaldehyde, and methylamine, and had the formula The refractive power of the lens prepared from the blank in accordance with the general procedure of Example 1 was +21 diopters.

EXAMPLE 5

A hemispherical mold having a diameter of 15 millimeters was charged with 150 milligrams of a polymerization mixture of the following composition:

| Ethylene glycol monomethacrylate | 80 |
|---|---|
| Diethylene glycol monomethacrylate | 8 |
| Glycerine trimethacrylate | 0.4 |
| Ethyl-azo-bis-isobutyrate | 2 |
| Water | 9.6 |

The mold contents were rotated at 375 revolutions per minute in the manner described in Example 1 while they were covered with a cover 4 made from transparent polymethyl methacrylate, and exposed to the radiation of a mercury vapor lamp placed 150 millimeters from the mold. The lamp was provided with a filter selectively permeable to radiation in the range of wavelengths between 3200 and 3700 Angstrom units. Heating of the polymerization mixture by mercury radiation outside the desired ultraviolet range was thus avoided. Copolymerization was complete after 30 minutes' rotation. The lens blank was immersed in 50 percent aqueous ethanol to swell it, and was otherwise handled as described in Example 1. The refractive power of the finished lens was +1 diopter.

The shape of a lens blank may be controlled not only by the size and shape of the mold, by the amount and nature of the polymerization charge, and by the rotary speed of the mold and of the charge during polymerization, but also by the relative position of the axis of rotation, of the center or axis of the mold, and of a vertical line drawn through the mold center.

EXAMPLE 6

The procedure of Example 1 was repeated, but modified by tilting the axis of rotation of the mold 30° with respect to a vertical line by the use of a mold having a radius of central curvature of 7.5 millimeters, and by a speed of rotation of 400 revolutions per minute. The lens ultimately obtained had a spherical refractive power of −5 diopters.

When the axis of rotation is inclined relative to the direction of gravitation, or when the axis of rotation does not pass through the optical axis of the lens, a prism component is added to the spherical component of lens refraction. A hydrogel lens of the invention having both spherical and prismatic refraction components is useful for improving the vision of an aphakic eye, as after a one-sided cataract operation. The prismatic lens component shifts the field of vision of the lens-less eye to a more normal position relative to the field of vision of the other eye.

Modified lens shapes that can be obtained by the choice of suitably contoured mold bottoms, by tilting the axis of rotation of the apparatus of FIG. 2, and by mounting mold bottoms eccentrically with respect to the axis of rotation are illustrated in FIGS. 3 to 7.

Figure 3:
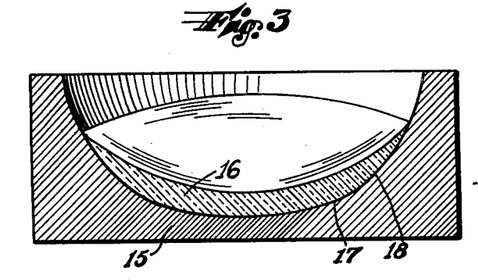
FIG. 3 shows a modified mold and the lens blank produced therein in axially sectional view.

FIG. 3 is an elevational axial section through a mold bottom 15 and the lens blank 16 formed therein by polymerization while the mold rotates. The mold bottom 16 has a central surface portion 17 and a peripheral annular surface portion 18. Both portions 17, 18 are of spherical shape, but the radius of curvature of the peripheral portion 18 is smaller than that of the central portion 17. Such a mold is advantageous in the forming of lenses having low refractive power and small diameters in that it provides for a lens thick enough for mechanical strength, yet retaining the feature of inner and outer lens surfaces meeting at a very small acute angle in a feather edge. The lens illustrated in FIG. 3 has a refractive power of less than −1 diopters, yet the concave and convex edge surfaces meet at an angle substantially smaller than thirty degrees.

Figure 4:
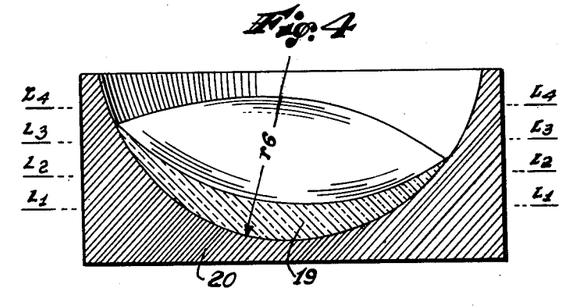
FIG. 4 shows yet another mold and the lens blank produced therein in an elevational view taken in a section corresponding to the line IV—IV of FIG. 6.
Figure 5:
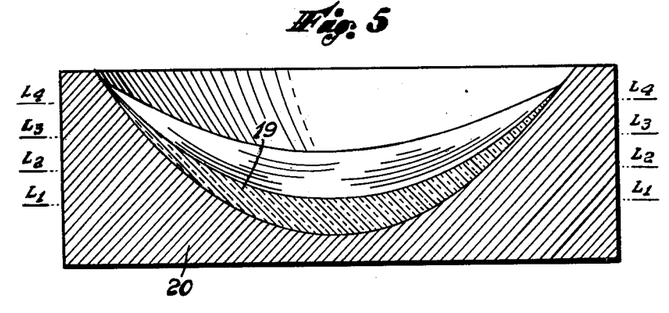
FIG. 5 illustrates the device of FIG. 4 in an elevational section corresponding to the line V—V in FIG. 6.
Figure 6:
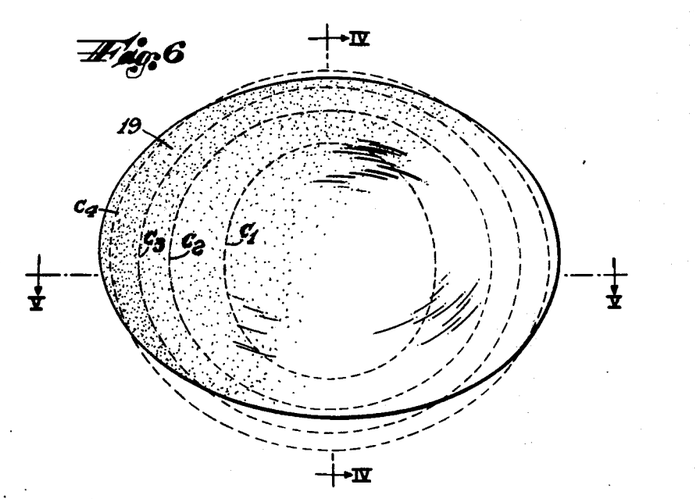
FIG. 6 shows the lens blank of FIGS. 4 and 5 in plan view.

FIGS. 4 to 6 illustrate the making of a lens blank 19 which has only one plane of symmetry as compared to the infinite number of planes of symmetry in a lens blank produced by rotation of a spherical mold about a vertical axis passing through the center of curvature of the mold. The lens blank 19 and the mold bottom 20 in which it was made are illustrated in FIG. 4 in section on the single plane of symmetry. FIG. 5 shows the mold bottom and lens in section on a plane perpendicular to the plane of symmetry through the optical axis of the lens, and FIG. 6 shows the lens blank formed as viewed in a direction parallel to the planes of FIGS. 4 and 5.

The molding surface of the mold bottom 20 is of elliptical section in all planes parallel to the outer radial faces of the mold bottom. The contours of the molding surface on the levels $L_1$, $L_2$, $L_3$, and $L_4$ in FIGS. 4 and 5 are indicated by broken lines $C_1$, $C_2$, $C_3$, and $C_4$ in FIG. 6. The mold was rotated during polymerization of the blank about an axis offset by an angle of 5° from the center line of the mold in the plane of symmetry. The contact lens blank 19 has a spherical refractive power of +16 diopters and a superimposed prismatic refractive power which makes it suitable for use on an aphakic eye. It elongated shape facilitates automatic centering of the contact lens over the iris as the eyelid is moved over the lens.

Figure 7:
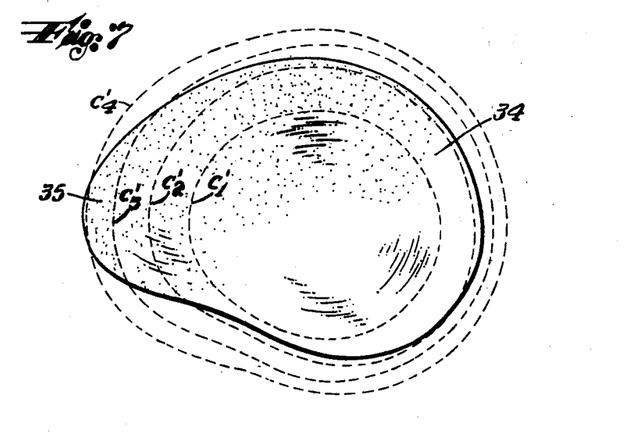
FIG. 7 shows an additional contact lens blank of the invention in a view corresponding to that of FIG. 6.

The lens blank 34 illustrated in FIG. 7 together with the contour lines $C_1'$ to $C_4'$ of the corresponding mold bottom, not itself shown, has no plane of symmetry. As is evident from the contour lines, the lens blank 34 was polymerized in a rotating mold having no plane of symmetry and rotated about an axis outside the centre. The lens blank 34 has a projecting lug 35 which extends into the inner corner of the eye in the operative position of the lens, thereby ensuring precise alignment of the lens with the pupil as is necessary in cases of severe astigmatic refraction defects. The lug 35 also provides reliable contact of the lens with a source of aqueous liquid for maintaining the lens in the proper swelled condition.

The normal automatic aligning effect of the moving eyelid on a contact lens of the invention placed over the cornea is enhanced by shallow circumferential grooves or depressions in the peripheral portions of the lens which sufficiently engage the moving eyelid yet do not cause irritation of the same. They are placed outside the field of sight, and thus do not interfere with vision.

Those skilled in the art will readily provide suitably contoured molds and rotate them about eccentric axes or axes obliquely inclined relative to a vertical direction in order to produce lens blanks of the invention which meet all known requirements as to refractive properties. They may be further guided by the following empirical formula for deriving the spherical refractive power D of a contact lens of the invention (in diopters) from the parameters of the molding apparatus and of the polymerization mixture:

$$D = \frac{N-1}{\alpha+1}\left(\frac{100}{R_o} + 356.3\sqrt{\frac{\rho}{\sigma}\cos\phi} - 1.218\, n\sqrt[4]{\frac{\rho}{\sigma\cos\phi}}\right)$$

wherein

N is the refractive index of the finished lens;

$\alpha$ is the coefficient of linear enlargement of the lens blank by swelling;

$R_o$ is the radius of curvature of the molding surface of the mold bottom in cm;

$\rho$ is the density of the polymerization mixture, in grams per cubic centimeter;

$\sigma$ is the surface tension thereof in dyn/cm;

$\phi$ is the angle defined by the axis of rotation and a vertical line; and n is the speed of rotation of the mold in revolutions per minute.

The formula reflects the fact that the refractive power of a lens of the invention is strongly influenced by the surface tension of the fluid polymerization mixture within the normal range of $R_o$, namely approximately 5 to 7 millimeters.

Regardless of the properties of the mold or of the nature of the polymeric hydrogel material which constitutes the finished lens, the lenses of the invention have sharp edges defining angles smaller than 45 degrees in any plane including the optical axis of the lens. The edge portion is thin and smooth, and closely adheres to the surface of the eye. The edge of the lens is as invisible to an onlooker as the main body of the lens.

In view of the entirely physical and mechanical nature of the parameters which enter into the above equation, the chemical nature of the lens material may be varied at will as long as the product obtained by polymerization of a fluid mixture including water-soluble monomers and subsequent swelling of the blank in an aqueous liquid is transparent, physiologically tolerated, soft, and dimensionally stable in contact with body fluids. The process of making the lens blanks of the invention is performed most readily with polymerization mixtures whose rate of polymerization is high at ordinary room temperature (about 15° to 25° C.) or at temperatures only slightly above room temperature (25° to 40° C.). The term "polymerization" as employed in this specification will be understood to include not only the chain polymerization of unsaturated monomers, but also the polycondensation and polymerization of cyclic monomers ("C-polymerization," W. H. Carothers), polyaddition reactions such as those between polyisocyanates and compounds having reactive hydrogen atoms, and similar well known reactions which produce polymeric, sparingly cross-linked bodies capable of swelling in aqueous liquids.

Any by-products formed during polymerization must be water soluble if they would interfere with proper use of the contact lens formed. In the preparation of polymeric hydrogels from such highly reactive monomers as the acyl halides derived from polybasic carboxylic acids, glycolates of alkali metals are therefore preferred reaction partners in the formation of polyesters since the alkali metal halides formed as by-products may readily be washed out of the hydrogel by water.

In order to produce a fully transparent lens, the polymerization mixture should constitute a single phase throughout the polymerization period, that is, miscibility of the components of the mixture should be maintained whle polymerization proceeds. Water is not an indispensable component of the mixture, but may be replaced in part or entirely by organic solvents readily soluble in water, such as the water soluble lower aliphatic alcohols, also polyvalent alcohols such as glycols and glycerol, dioxane, and the like, which are displaced by water when the lens blank is immersed in water for a sufficient time. When an anhydrous polymerization medium such as dioxane is used, ionic polymerization catalysts such as an alkoxy lithium compound may be employed.

Extensive clinical tests have shown that the glycol and glycerol esters of acrylic acid and lower-alkyl-acrylic esters form copolymers of the required optical and mechanical properties which are well tolerated by the human body in periods of contact which extend over several years. Preliminary tests, however, indicate that suitable hydrogels may be prepared from other hydrophilic monoolefinic monomers mixed with small amounts of diolefinic cross linking agents.

Such mono-olefinic compounds include, for example, the monoglycol-monoallyl ester of malic acid, the diglycol monoallyl ester of citric acid, the diglycol ester of itaconic acid, and diglycol fumarate as the minor component of a mixture with a major amount of glycol monomethacrylate. Diolefinic or polyolefinic crosslinking agents further representative of those useful for the purpose of the invention include diallyl malate, diallyl-monoglycol citrate, allylvinyl malate, glycol vinyl allyl citrate, monoglycol monoallyl itaconate, monoglycol monoallyl fumarate, and polyesters prepared by condensation of maleic anhydride with triethylene glycol and having a sufficiently low molecular weight to be water soluble.

Implantation tests in rabbits indicate that lenses made from the neutral non-ionogenic hydrogels produced from these monoolefinic and polyolefinic monomers are well tolerated even when the implant replaces the natural lens within the eye. Ionogenic hydrogels, however, are also adequately tolerated for use in contact lenses when the ions formed do not significantly affect the hydrogen ion concentration of the tissue with which they are in contact.

It is therefore possible to replace the dimethylaminoethyl acetate and other activators described in Examples 1 to 6 by 5 percent of the hydrochloride of dimethylaminoethyl methacrylate. The latter compound not only increases the rate of polymerization, but it is also incorporated in the macromolecule produced. Contact lenses consisting of hydrogels so modified and later neutralized do not noticeably irritate the eye on which they are worn. Similarly, the presence of 2 percent free methacrylic acid in the monomer mixture is not objectionable, if any free carboxyl groups present in the hydrogel of the finished lens are neutralized by simultaneously present alkali, for example, by sodium ions supplied by immersion of the lens blank in a weekly alkaline medium.

The monomeric esters of acrylic and lower-alkyl-acrylic acids with polyhydric alcohols as illustrated in the Examples are readily available in a purity sufficient to give the desired optical properties to the hydrogel lens ultimately obtained. They are stable at low temperature for long periods without the need for polymerization inhibitors. The sparingly cross-linked hydrogels made from these monomers are chemically and dimensionally stable while stored in physiological saline solution and under the conditions of use as contact lenses. They may be sterilized in boiling water. They are capable of absorbing considerable amounts of water-soluble medicinal compounds, such as oxytetracycline hydrochloride or boric acid, from the aqueous solutions of these compounds, and to release them to an eye on which a hydrogel lens is placed. Conjunctivitis and other ophthalmic diseases may thus be treated by the use of the contact lenses of the invention.

The catalyst system employed for initiating polymerization of the monomer mixture may be chosen from a wide variety of well-known compounds and compound combinations as partly illustrated by the specific Examples. Catalyst systems which provide free radicals at the desirable process temperatures of 20° to 50° C. are preferred. Redox systems have been found very convenient. Their oxidizing component may be hydrogen peroxide, the peroxide derivative of an acid, or a peracid such as persulfuric acid and its salts. The reducing component may be ferrous sulfate when hydrogen peroxide is the oxidizing component, and will also act as a polymerization accelerator, as is well known.

Other oxidizing components for a redox catalyst system include the water soluble salts of peracetic and perboric acid, cumene hydroperoxide, and peracetals of alifatic and alicyclic ketones. It is a common feature of these compounds that they are soluble in the polymerization mixture in effective amounts, and that they and their decomposition products can be removed from the lens blank or the finished lens by washing with water. Reducing components for a redox catalyst system also may include sulfites, pyrosulfites, hydrosulfites, thiosulfates of the alkali metals and of ammonium, formaldehyde bisulfite, ascorbic acid, glucose, and many other compounds which will readily suggest themselves to those skilled in this art.

Metals forming compounds in different valence states may be used in trace amounts as valuable addition agents to the catalyst system. The use of copper ions has been illustrated in Example 3, but iron, cobalt, nickel, manganese, cerium, and silver are similarly effective. The range of polymerization initiators and accelerators suitable in the polymerization process of the invention further includes azo compounds such as the esters and the nitrile of azo-bis-isobutyric acid. Azo compounds are employed in such amounts that the gaseous nitrogen formed by their decomposition dissolves in the polymerization mixture, and is gradually released by diffusion without forming visible bubbles. Polymerization may further be initiated by electromagnetic radiation of short wavelength, such as the ultraviolet rays described in Example 5. Radiation sources may be employed in a known manner in conjunction with catalyst systems consisting of ferric chloride and an organic acid, of perchlorates or potassium permanganate and oxalic acid or benzoine.

The ratio of the components in the polymerization mixture may be varied within fairly wide limits. Some empirical rules have been found useful in producing consistently acceptable lens blanks. The solvent content of the polymerization mixture should be between 5% and 50%, preferably between 15% and 40% by weight, the solvent being either water or a water soluble organic liquid. When these limits are observed, a clear, homogeneous blank is produced by polymerization, and is capable of swelling substantially when subsequently brought into contact with water. The desired mechanical properties of the lens are obtained when the cross-linking agent amounts to only a small fraction of the total amount of monomers present, and to only 0.1 and 1.9 percent of the polymerization mixture by weight.

The apparatus illustrated in FIG. 2 may be modified in many aspects without departing from the spirit of the invention. One of three delivery tubes 11, 12, and 13 and the corresponding pump need not be used if a redox catalyst system is employed. The oxidizing component of the system may be pre-mixed with a portion of the monomers and/or the solvent, and the reducing component may be pre-mixed with the remainder of the monomers and the solvent. The pre-mixes are relatively stable, and precise metering of the very small amounts of catalysts is facilitated by the dilution with the very much larger amounts of monomers and/or solvent. The cross-linking agent is preferably added to that pre-mix which is less prone to polymerize spontaneously.

The materials of construction employed for the apparatus of FIG. 2 are non-critical with the exception of the mold bottom. Many materials are available for making a mold bottom whose molding face can be accurately shaped and very smoothly finished. Glass and silica may be shaped to the desired contours at elevated temperature and are chemically inert to the polymerization mixture. Chromium plated metallic mold bottoms also have been found acceptable. Useful molds have been prepared from pure, unfilled phenolic, carbamide, or melamine resins by compression molding at elevated temperature with a highly polished metal die. Good silicate glass, however, offers the preferred combination of chemical inertness, smooth surface, ready formability, and low cost.

Although hydrogels having in swollen state a very low elasticity modulus of e.g. 0.1–10 kg/cm$^2$ are preferred materials for contact lenses according to the present invention, it is also possible to use "internally plasticized" soft, rubbery hydrophobic polymers and copolymers such as copolymers of butyl methacrylate with vinyl acetate, styrene, vinyl acetals etc, advantageously with admixture of less than 2% of a cross-linking agent such as divinyl benzene. Copolymers of vinyl acetals may be prepared in known manner by saponifying the vinyl acetate component and treating the copolymer with aldehydes. Such soft copolymers having E-modulus lower than 1,000 are known. They were used hitherto e.g. as thermoplastic foils for binding or cementing wood, glass and other materials.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A sparingly cross-linked polymeric hydrogel in the shape of a corneal contact lens;
   (a) said lens being contained in physiological saline solution and in osmotic equilibrium therewith thereby attaining its final dimensions;
   (b) said lens being chemically and dimensionally stable while so contained in said physiological saline solution and under conditions of use as a contact lens;
   (c) said lens after attaining its final dimensions being characterized by good optical quality, full transparency, softness, resiliency, and an inner concave surface and outer convex surface which meet in a thin edge such that when said lens is positioned on the cornea of the eye it blends smoothly with the corneal surface thereof without any sudden step at the boundary of the cornea and lens surfaces.

2. The hydrogel lens of claim 1 whose inner and outer surfaces meet in smooth feather edge substantially smaller than 45° in any plane which includes the optical axis.

3. The hydrogel lens of claim 2 in which atmospheric oxygen dissolves therein and penetrates to the cornea covered by said lens.

4. The hydrogel lens of claim 3 which has the capability of being sterilized in boiling water without loss of its dimensional stability.

5. The hydrogel lens of claim 4 which is a polymer of an ester of acrylic acid and a polyhydric alcohol.

6. The hydrogel lens of claim 4 which is a polymer of an ester of a lower alkyl-acrylic acid and a polyhydric alcohol.

7. The hydrogel lens of claim 4 which is a polymer of (a) an unsaturated ester in which the acid moiety is of the group consisting of acrylic acid and lower alkyl-acrylic acid, and in which the alcohol moiety is of the group consisting of glycol and glycerol, and (b) a diolefinic cross-linking agent.

8. The hydrogel lens of claim 7 which is a polymer of (a) ethylene glycol monomethacrylate, and (b) ethylene glycol dimethacrylate.

9. A sparingly cross-linked polymeric hydrogel in the shape of a corneal contact lens;
   (a) said lens having previously attained its final dimensions in physiological saline solution;
   (b) said lens being chemically and dimensionally stable under conditions of use as a contact lens;
   (c) said lens being characterized by good optical quality, full transparency, softness, resiliency, and an inner concave surface and outer convex surface which meet in a thin edge such that when said lens is positioned on the cornea of the eye it blends smoothly with the corneal surface thereof without any sudden step at the boundary of the cornea and lens surfaces.

10. The hydrogel lens of claim 9 whose inner and outer surfaces meet in smooth feather edge substantially smaller than 45° in any plane which includes the optical axis.

11. The hydrogel lens of claim 10 in which atmospheric oxygen dissolves therein and penetrates to the cornea covered by said lens.

12. The hydrogel lens of claim 10 which has the capability of being sterilized in boiling water without loss of its dimensional stability.

13. The hydrogel lens of claim 12 which is a polymer of an ester of acrylic acid and a polyhydric alcohol.

14. The hydrogel lens of claim 12 which is a polymer of an ester of a lower alkyl-acrylic acid and a polyhydric alcohol.

15. The hydrogel lens of claim 14 which is a polymer of (a) ethylene glycol monomethacrylate, and (b) ethylene glycol dimethacrylate.

16. A contact lens
   (i) formed from three-dimensional hydrogel consisting essentially of polymerized methacrylate units;
   (ii) said lens having a concave inner surface and a convex outer surface;
   (iii) said lens having a sharp edge such that said lens blends smoothly with the uncovered surroundings of the cornea;
   (iv) said lens being contained in a physiological solution and in osmotic equilibrium therewith;
   (v) said lens being in condition for application to the eye.

17. A contact lens
   (i) formed from three-dimensional hydrogel characterized predominantly by polymerized glycol methacrylate units;
   (ii) said lens having a concave inner surface and a convex outer surface;
   (iii) said lens having a sharp edge such that said lens blends smoothly with the uncovered surroundings of the cornea;
   (iv) said lens being contained in a physiological solution and in osmotic equilibrium therewith;
   (v) said lens being in condition for application to the eye.

18. A hydrophilic soft contact lens comprising:
   (a) a hydrogel formed of a three-dimensional polymer of a glycol monomethacrylate and a small amount of a glycol dimethacrylate;
   (b) said lens being in osmotic equilibrium with a physiological solution;
   (c) said lens having a concave inner surface and a convex outer surface; and
   (d) said lens having a sharp edge causing the lens to blend smoothly with the uncovered surroundings of a cornea and thereby being non-irritating to the eyelid.

* * * * *

UNITED STATES PATENT AND TRADEMARK OFFICE
CERTIFICATE OF CORRECTION

PATENT NO. : 4,153,349
DATED : May 8, 1979
INVENTOR(S) : Otto Wichterle

It is certified that error appears in the above—identified patent and that said Letters Patent are hereby corrected as shown below:

In the cover sheet, after the line beginning [22], there should be inserted:

--[30] Foreign Application Priority Data
Dec. 27, 1961    Czechoslovakia......    7654/61

Signed and Sealed this

Ninth Day of October 1979

[SEAL]

Attest:

RUTH C. MASON
Attesting Officer

LUTRELLE F. PARKER
Acting Commissioner of Patents and Trademarks